(12) United States Patent
Shibata et al.

(10) Patent No.: US 6,961,169 B2
(45) Date of Patent: Nov. 1, 2005

(54) LIGHT-CONTROLLED LIGHT MODULATOR

(75) Inventors: Yasuo Shibata, Kanagawa (JP); Yasuhiro Suzuki, Kanagawa (JP); Yoshihisa Sakai, Kanagawa (JP); Yasumasa Suzaki, Kanagawa (JP); Akira Okada, Tokyo (JP); Kazuto Noguchi, Kanagawa (JP); Rieko Sato, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 10/823,179

(22) Filed: Apr. 13, 2004

(65) Prior Publication Data

US 2004/0190809 A1 Sep. 30, 2004

Related U.S. Application Data

(62) Division of application No. 09/953,796, filed on Sep. 17, 2001, now Pat. No. 6,753,996.

(30) Foreign Application Priority Data

| Sep. 21, 2000 | (JP) | 2000-286601 |
| Aug. 20, 2001 | (JP) | 2001-249034 |
| Aug. 20, 2001 | (JP) | 2001-249035 |
| Aug. 20, 2001 | (JP) | 2001-249037 |

(51) Int. Cl.[7] .............................. G02F 1/01; G02F 1/00; G02F 1/295; H04J 14/00
(52) U.S. Cl. ...................... 359/279; 359/237; 359/238; 398/53; 385/5
(58) Field of Search .............................. 359/237, 238, 359/244, 279; 385/1–6, 24, 42; 398/53, 79, 183, 188

(56) References Cited

U.S. PATENT DOCUMENTS

| 5,754,714 A | 5/1998 | Suzuki et al. .................. 385/5 |
| 5,999,293 A | 12/1999 | Manning ...................... 398/52 |

FOREIGN PATENT DOCUMENTS

WO    WO 99/25081    5/1999

OTHER PUBLICATIONS

Eiselt, M., "Optical Loop Mirror With Semiconductor Laser Amplifier", *Electronics Letters*, vol. 28, No. 16, Jul. 30, 1992, pp. 1505–1507.

Eiselt, M. et al., "All–Optical High Speed Demultiplexing With A Semiconductor Laser Amplifier In A Loop Mirror Configuration", *Electronics Letters*, vol. 29, No. 13, pp. 1167–1168.

(Continued)

*Primary Examiner*—Loha Ben
*Assistant Examiner*—William Choi
(74) *Attorney, Agent, or Firm*—Fitch, Even, Tabin & Flannery

(57) ABSTRACT

A light-controlled light modulator can achieve high-speed, low-loss wavelength conversion. Continuous light with a wavelength $\lambda j$ is launched into an MMI coupler via a port, and is split into two parts by the MMI coupler, which are led to a loop-type interferometer. In the loop-type interferometer, the two parts travel separately around the loop as clockwise traveling light and counterclockwise traveling light, are combined by the MMI coupler again via a filter-equipped phase modulator, thereby being emitted to the port. In this state, signal light $\lambda i(s)$ with a wavelength $\lambda i$ is launched into the filter-equipped phase modulator via a port. Even when the wavelength $\lambda i$ of the signal light $\lambda i(s)$ is equal to the wavelength $\lambda j$ of the wavelength converted output light, the wavelength conversion can be achieved with preventing noise from being mixed into the output light emitted from a port.

28 Claims, 15 Drawing Sheets

OTHER PUBLICATIONS

Durhuus, T. et al., "All–Optical Wavelength Conversion by SOA's in a Mach–Zehnder Configuration", *IEEE Photonics Technology Letters*, vol. 6, No. 1, Jan. 1994, pp. 53–55.

Ratovelomanana, F. et al., "An All–Optical WavelengthConverter with Semiconductor Optical Amplifiers Monolithically Integrated in an Asymmetric Passive Mach–Zehnder Interferometer", *IEEE Photonics Technology Letters*, vol. 7, No. 10, Oct. 1995, pp. 992–994.

Eiselt, M. et al., "SLALOM: Semiconductor Laser Amplifier in a Loop Mirror", *Journal of Lightwave Technology*, vol. 13, No. 10, Oct. 1995, pp. 2099–2112.

Jahn, E. et al., "Monolithically Integrated Nonlinear Sagnac Interferometer and Its Application as a 20 Gbit/s All–Optical Demultiplexer", *Electronics Letters*, vol. 32, No. 9, Apr. 25, 1996, pp. 782–784.

Deng, Kung–Li et al., "Single–Shot Optical Sampling Oscilloscope for Ultrafast Optical Waveforms", *IEEE Photonics Technology Letters*, vol. 10, No. 3, Mar. 1998, pp. 397–399.

Ueno, Y. et al., "New Wavelength Converter For Picosecond RZ Pulses", *Optoelectronics and High–Frequency Device Research Labs, NEC Corp.*, ECOC '98, Sep. 20–24, 1998, Madrid, Spain, pp. 1–2.

Nesset, Derek et al., "All–Optical Wavelength Conversion Using SOA Nonlinearities", *IEEE Communications Magazine*, Dec. 1998, pp. 56–61.

Leuthold, J. et al., "Compact and Fully Packaged Wavelength Converter with Integrated Delay Loop for 40 Gbit/s RZ Signals", *Bell Labs, Lucent Technologies*, pp. PD17–1–PD17–3.

Ueno, Y. et al., "168–Gb/s OTDM Wavelength Conversion Using An SMZ–Type All–Optical Switch", *Optoelectronics and High Frequency Device Research Labs, NEC Corporation*, 2 pages.

Leuthold, J. et al., "100 Gbit/s All–Optical Wavelength Conversion with Integrated SOA Delayed–Interference Configuration", *Electronics Letters*, vol. 36, No. 13, Jun. 22, 2000, 2 pages.

Leuthold, J. et al., "All–Optical Wavelength Conversion up to 100 Gbit/s with SOA Delayed–Interference Configuration", *Bell Labs, Lucent Technologies*, 2 pages.

Jiang, Leaf A. et al., "Sampling Pulses with Semiconductor Optical Amplifiers", *IEEE Journal of Quantum Electronics*, vol. 37, No. 1, Jan. 2001, pp. 118–126.

Shibata, Yasuo et al., Filter–free Wavelength Conversion using a Sagnac Interferometer Integrated with Parallel Amplifiers Structure (SIPAS), *Proceedings of OECC/IOOC 2001 Conference*, Jul. 2–5, 2002, pp. 212–213.

European Search Report dated Jan. 15, 2003 for Application No. EP 01 12 2297, 4 pages.

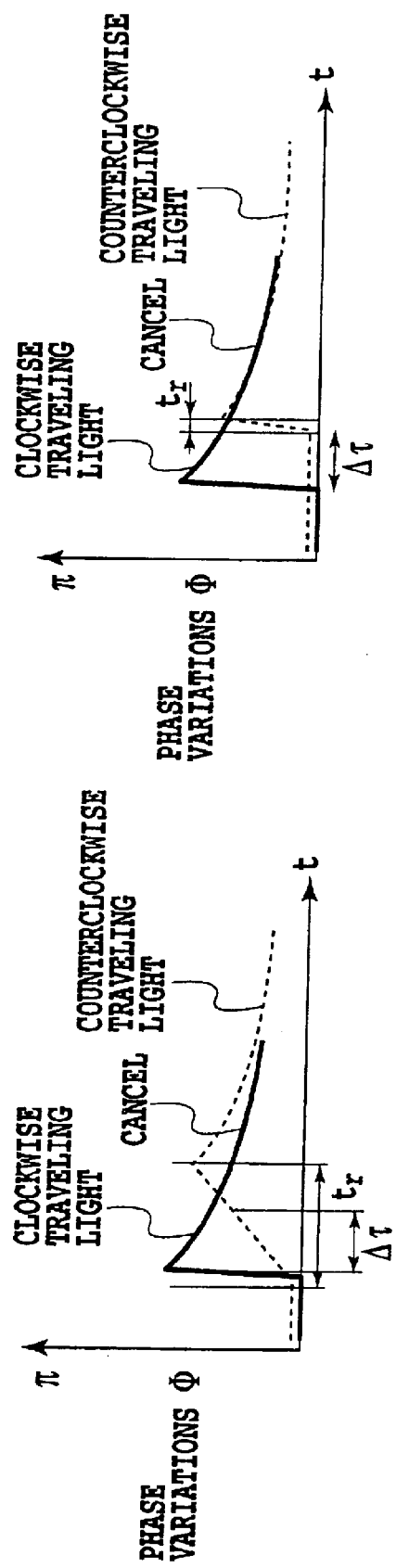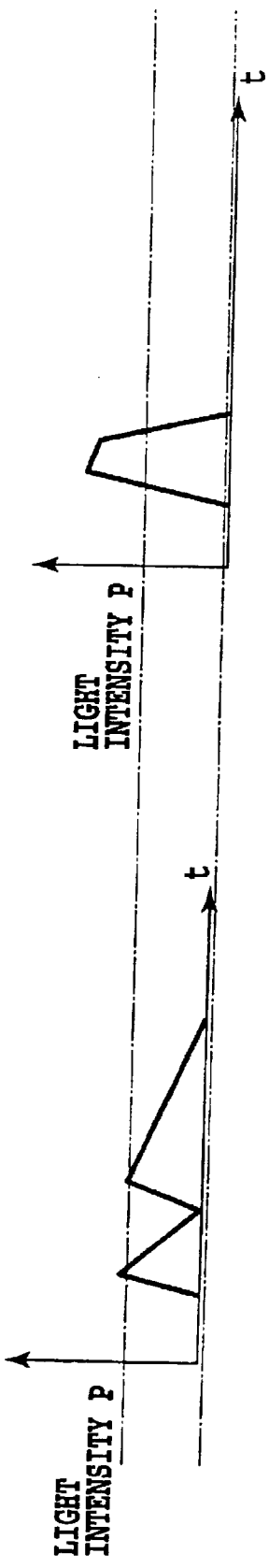

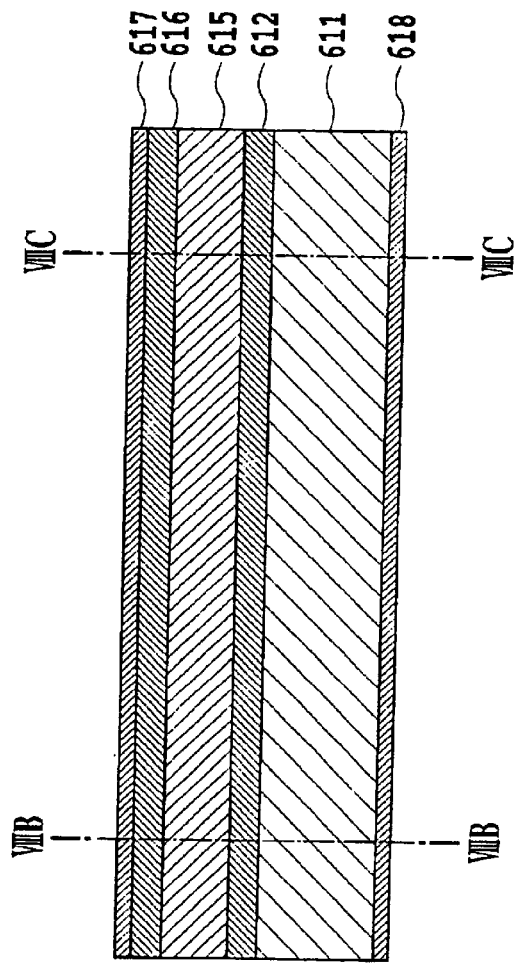
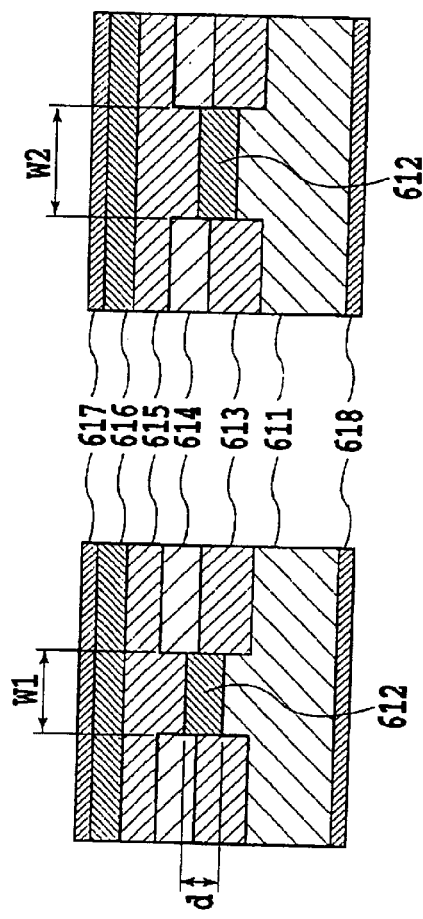
FIG.8A
FIG.8B
FIG.8C

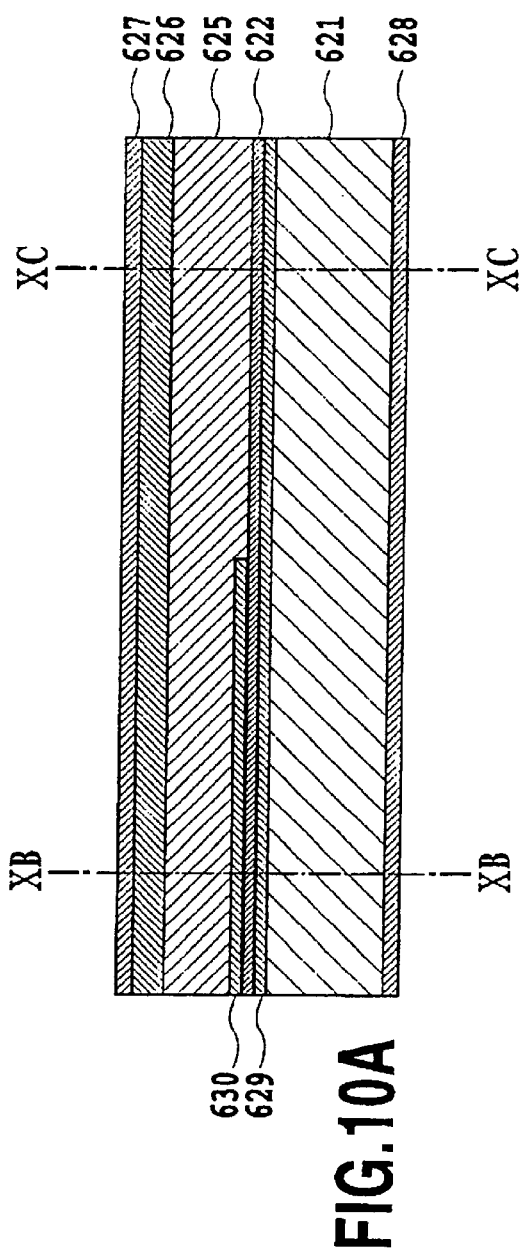
FIG.10A
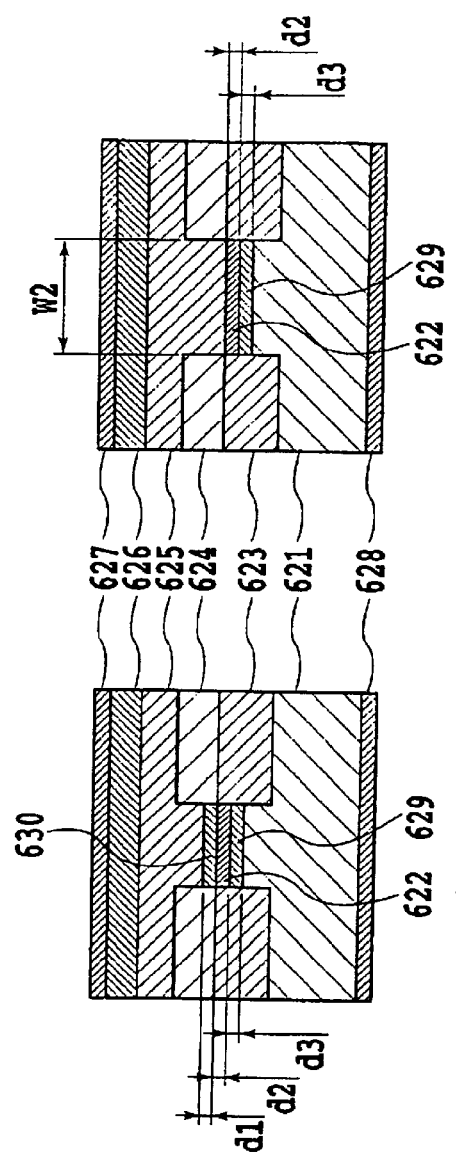
FIG.10B
FIG.10C

US 6,961,169 B2

LIGHT-CONTROLLED LIGHT MODULATOR

This is a division of application Ser. No. 09/953,796, filed Sep. 17, 2001, issued as U.S. Pat. No. 6,753,996 on Jun. 22, 2004, which is hereby incorporated herein by reference in their entirety.

This application is based on Patent Application Nos. 2000-286601 filed Sep. 21, 2000, 2001-249034 filed Aug. 20, 2001, 2001-249035 filed Aug. 20, 2001 and 2001-249037 filed Aug. 20, 2001 in Japan, the content of which is incorporated hereinto by reference.

BACKGROUND OF THE INVENTION

1. Field of the Invention

The present invention relates to a light-controlled light modulator, and more particularly to a light-controlled modulation technique for modulating light with a wavelength identical to or different from input signal light with an arbitrary wavelength in response to the intensity of the input signal light in a wavelength division multiplexed optical network.

2. Description of the Related Art

Conventionally, as an optical transmission system for transmitting optical signals with different wavelengths, an optical transmission system using wavelength division multiplexing (WDM system) has been known which transmits the optical signals with different wavelengths by combining them into a single optical fiber. Recently, such WDM systems have been increasingly applied not only to one-to-one transmission, but also to network transmission.

In such WDM systems, a light-controlled light modulator is increasing its importance which carries out wavelength conversion, that is, which converts the wavelength of an optical signal traveling through an optical fiber into the same or different wavelengths.

FIG. 1 is a diagram showing a circuit of a conventional wavelength converter. The wavelength converter consists of a symmetric Mach-Zehnder interferometer that comprises SOAs (Semiconductor Optical Amplifiers) 105 and 106, MMI (Multi-Mode-Interference) couplers 101, 102 and 103 connected to the SOAs 105 and 106, an MMI coupler 104 connected to the MMI couplers 102 and 103, and optical waveguides interconnecting them. In FIG. 1, the reference numeral 107 designates signal light, 108 designates continuous light, 109 designates output light and 110 designates a port.

The operation of the wavelength converter with such a configuration will now be described.

The continuous light (CW light) 108 with a wavelength $\lambda j$ is launched into the MMI coupler 101, and split into two optical waveguides. The two continuous light waves pass through the SOAs 105 and 106 and the MMI couplers 102 and 103, and are coupled by the MMI coupler 104 to be emitted from the port 110.

In this state of the wavelength converter, the optical signal $\lambda i(s)$ 107 with the wavelength $\lambda i$ is launched into the MMI coupler 102, and then into the SOA 105. Here, the optical signal 107 varies the refractive index of the SOA 105.

As a result, the interference conditions change of the symmetric Mach-Zehnder interferometer comprising the MMI couplers 101, 102, 103 and 104 so that only when the signal light 107 is "1", the output light with the wavelength $\lambda j$ is emitted from the port 109. Thus, the optical signal with the wavelength $\lambda i$ is transformed to light with the wavelength $\lambda j$ to be emitted from the port 109 as the output light $\lambda j(s)$.

In this method, the transmission rate of the input signal light is limited by the recovery time of carrier density changes of the SOAs 105 and 106. Thus, the speed of the wavelength conversion of the optical signal is limited to about 20 Gbps at most.

FIG. 2 is a diagram showing another conventional wavelength converter. The wavelength converter comprises an SOA 201, MMI couplers 202 and 203 connected to the SOA 201, and a loop-type interferometer 209 connected between the MMI couplers 202 and 203. In FIG. 2, the reference numeral 204 designates signal light, 205 designates continuous light, 206 designates counterclockwise traveling light, 207 designates clockwise traveling light, 208 designates output light and 210 and 211 each designate a port.

In the configuration, the continuous (CW) light 205 with the wavelength $\lambda j$ is launched into the MMI coupler 203 through the port 211, and is split into two parts by the MMI coupler 203, which are delivered to the loop-type interferometer 209. In the loop-type interferometer 209, the two parts travel around the loop as the clockwise traveling light 207 and counterclockwise traveling light 206, are recombined by the MMI coupler 203 to be emitted from the port 211.

In this state, the signal light $\lambda i(s)$ 204 with the wavelength $\lambda i$ is launched into the MMI coupler 202. The incident signal light 204 passes through the SOA 201, which varies its refractive index. Thus, the light with the wavelength $\lambda j$ traveling in the loop is affected by the change in the refractive index, resulting in phase variations as shown in FIG. 3A.

The clockwise traveling light 207 brings about abrupt phase variations, followed by recovering of the phase at a rate corresponding to the recovery time of carrier density changes of the SOA 201, and is launched into the MMI coupler 203.

The counterclockwise traveling light 206 also undergoes similar phase variations. However, since it travels through the loop-type interferometer 209 longer than clockwise traveling light 207 by a distance $\Delta L$, it is launched into the MMI coupler 203 with a delay time $\Delta \tau$.

Accordingly, in the MMI coupler 203, the time of the phase variations differs by an amount of $\Delta \tau = \Delta L/(c/n_{eq0})$ between the clockwise traveling light 207 and the counterclockwise traveling light 206, where c is the speed of light, and $n_{eq0}$ is the equivalent refractive index of the waveguide constituting the loop. The two continuous light waves with the same wavelength $\lambda j$ interfere with each other in the MMI coupler 203. In the course of this, their phases differ only during the time period $\Delta \tau$ and nearly equal thereafter. As a result of the interference, the light is emitted from the port 210 only during the time slot $\Delta \tau$ as illustrated in FIG. 3B. In other words, the input optical signal with the wavelength $\lambda i$ is transformed to the light with the wavelength $\lambda j$ to be output to the port 210 as output light $\lambda j(s)$ 208.

In the wavelength converter with such a loop-type interferometer, the counterclockwise traveling light 206 and the clockwise traveling light 207 have the same phase variations during the time the light phase variations gradually recover in response to the carrier concentration in the SOA 201, except for the time period $\Delta \tau$. Therefore, as a result of the interference, the effect of the variations in the refractive index in the SOA 201 are canceled out, and the light with the wavelength $\lambda j$ is emitted from the port 211 except for the time period $\Delta \tau$. Thus, as illustrated in FIG. 3B, the waveform after the wavelength conversion output from the port 210 includes no low-rate components whose rate is limited by the recovery time due to the carrier density changes, enabling high-speed wavelength conversion with steep rising and falling edges.

In the wavelength converter with the loop-type interferometer 209, however, the input signal light 204 is combined and output from the same port 210 as the output light 208. Therefore, to separate the output light 208 from the input light 204, a wavelength filter 212 must be connected to the output port 210 to extract only the output light 208.

Furthermore, when the wavelength λi of the signal light is the same as the wavelength λj of the wavelength conversed light, the wavelength filter 212 cannot separate them. This means that the light before the wavelength conversion is mixed into the output light as noise. Thus, it has a problem of being unable to carry out the conversion of the same wavelength. In addition, since the 3 dB coupler 202 is used to split the continuous light 205 with the wavelength λj, it has a problem of bringing about 3 dB additional loss in principle.

Moreover, when the wavelength converter with the loop-type interferometer is used, it is necessary that the length of the SOA 201 is sufficiently smaller than ΔL as illustrated in FIG. 2. More specifically, since the clockwise traveling continuous light 207 travels in the same direction as the signal light 204, it undergoes the effect of the variations in the refractive index throughout the length $L_{SOA}$ of the SOA 201. In contrast, since the counterclockwise traveling continuous light 206 travels in the direction opposite to the signal light 204, it does not undergo any effect of the variations in the refractive index until it encounters the signal light 204. Besides, since the effect of the variations in the refractive index varies depending on the position they encounter, the phase variation requires a rising time $t_r=2\times L_{SOA}/(c/n_{eq})$, where c is the speed of light and $n_{eq}$ is the equivalent refractive index of the SOA.

As a result, if the length of the SOA 201 is in the same order as ΔL, the phase variations of the clockwise and counterclockwise traveling continuous light waves become as illustrated in FIG. 4A, thereby deforming the waveform of the converted light emitted from the port 210 as illustrated in FIG. 4B because of the interference. Thus, it presents a problem in that the converted light emitted from the port 210 reduces its intensity as compared with that of FIG. 3B, thereby increasing the loss.

SUMMARY OF THE INVENTION

The present invention is implemented to solve the foregoing problems. Therefore, the object of the present invention is to provide a light-controlled light modulator that obviates the need for the wavelength filter, and that has a high-speed wavelength conversion function capable of converting an input signal with a wavelength to an output signal with the same wavelength as the input signal at a low loss.

To realize the foregoing object, according to a 1st aspect of the present invention, there is provided a light-controlled light modulator for modulating, in response to light intensity of first input light with an arbitrary wavelength, second input light with a wavelength identical to or different from a wavelength of the first input light, said light-controlled light modulator comprising; an optical combiner/splitter for combining the first input light and the second input light, and for distributing them to a plurality of ports; phase modulators, which are connected to the plurality of ports, including media that vary their refractive indices in response to the light intensity of the first input light; an optical combiner for combining outputs from said phase modulators; and optical branching-delaying means for branching and delaying the second input light.

According to a 2nd aspect of the invention, a light-controlled light modulator comprising: first optical branching means for branching first input light; optical branching-delaying means for branching lo and delaying second input light, a first optical combiner/splitter for combining a first branched part of the first input light with a branched part of the second input light, and for distributing them to a plurality of ports; phase modulators, which are connected to the plurality of ports, including media that vary their refractive indices in response to light intensity of the first input light; and a second optical combiner/splitter for combining outputs from said phase modulators and for branching them to a plurality of parts, and for coupling branched outputs with a second branched part of the first input light and a second branched part of the second input light.

According to a 3rd aspect of the invention, the light-controlled light modulator, wherein said optical combiner/splitter for combining the first input light and the second input light, and for distributing them to a plurality of ports, said phase modulators, which are connected to the plurality of ports, including media that vary their refractive indices in response to the light intensity of the first input light, and said optical combiner for combining outputs from said phase modulators constitutes a symmetric Mach-Zehnder optical circuit.

According to a 4th aspect of the invention, the light-controlled light modulator, wherein said optical branching-delaying means comprises a loop-type optical interferometer.

According to a 5th aspect of the invention, the light-controlled light modulator, wherein a length of said media whose refractive indices vary in response to the light intensity of the first input light is shorter than a difference between a first length and a second length, the first length being equal to a length from said branching-delaying means for branching and delaying the second input light to said phase modulators via said optical combiner/splitter that combines the first input light with a first branched part of the second input light and distributes them to the plurality of ports, and the second length being equal to a length from said branching-delaying means to said phase modulators via said optical combiner that combines the outputs from said phase modulators and couples them to a second part of the branched second input light.

According to a 6th aspect of the invention, The light-controlled light modulator, further comprising a plurality of controllers for controlling states of said phase modulators including the media whose refractive indices vary in response to the light intensity of the first input light.

According to a 7th aspect of the invention, The light-controlled light modulator, wherein the media of said phase modulators with the media whose refractive indices vary in response to the light intensity of the first input light have a cross section that varies along a propagation direction of light.

According to a 8th aspect of the invention, the light-controlled light modulator, wherein said optical branching-delaying means consists of an asymmetric Mach-Zehnder optical circuit.

According to a 9th aspect of the invention, the light-controlled light modulator, wherein semiconductor optical amplifiers are used as said phase modulators including the media whose refractive indices vary in response to the light intensity of the first input light.

According to a 10th aspect of the invention, the light-controlled light modulator, further comprising means for controlling the intensity of the input light.

According to a 11th aspect of the invention, the light-controlled light modulator, wherein said means for controlling the intensity of the input light comprises an optical amplifier with a gain control function.

As described above, according to the present invention, the output port emits only the output light after the wavelength conversion without emitting the slightest part of the input light. Accordingly, it is not necessary to connect the filter for separating the output light from the input light to the output port. In addition, even when the wavelength of the input signal light is identical to that of the converted light, the problem is eliminated in that the light before the wavelength conversion is not mixed into the output light as noise. Thus, the present invention can provide a light-controlled light modulator with a high-speed wavelength conversion function capable of converting an input signal with a wavelength to an output signal with the same wavelength as the input signal.

The above and other objects, effects, features and advantages of the present invention will become more apparent from the following description of embodiments thereof taken in conjunction with the accompanying drawings.

BRIEF DESCRIPTION OF THE DRAWINGS

FIGS. 6A–6D are graphs illustrating the phase variations and light intensity characteristics of a wavelength converter in accordance with the present invention;

FIG. 8A–8C are cross-sectional views showing a structure of an SOA of a third embodiment in accordance with the present invention, which is fabricated using an n-type substrate;

FIG. 10A–10C are cross-sectional views showing a structure of an SOA of a fourth embodiment in accordance with the present invention, which is fabricated using an n-type substrate;

DETAILED DESCRIPTION OF PREFERRED EMBODIMENTS

The preferred embodiments in accordance with the present invention will now be described with reference to accompanying drawings.

[Embodiment 1]

Figure 5:
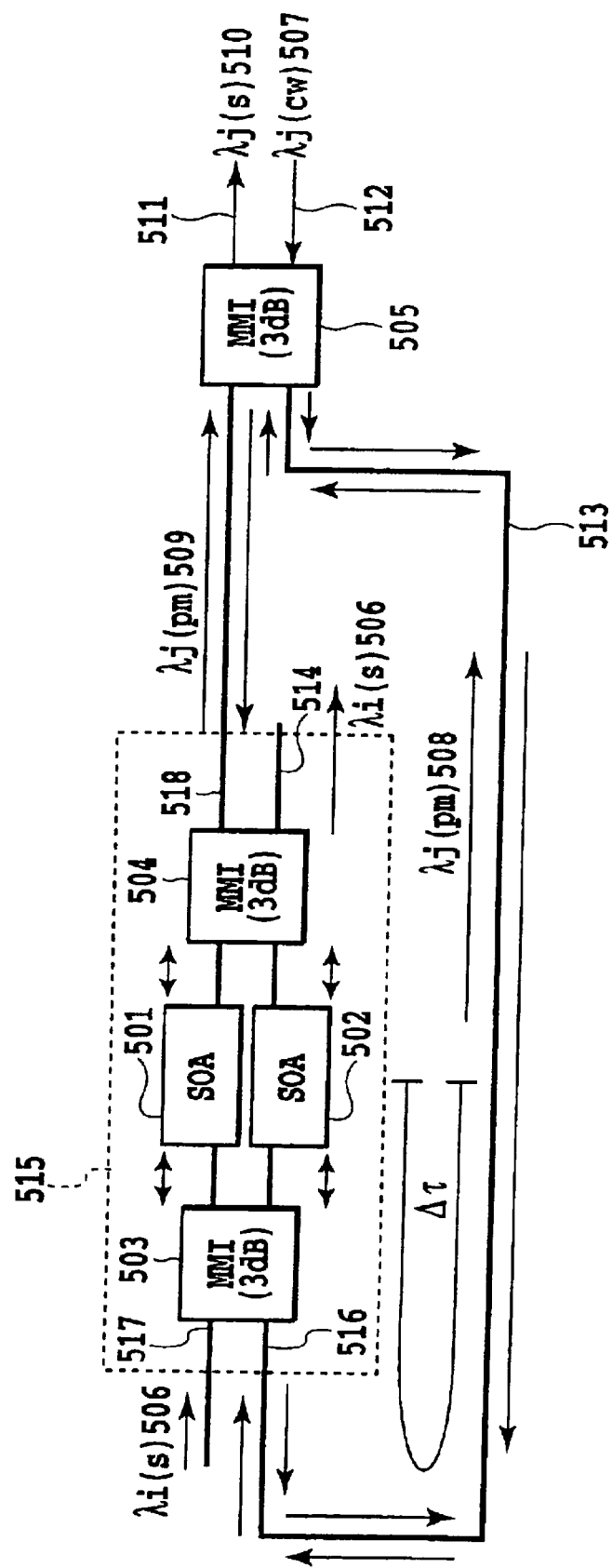
FIG. 5 is a block diagram showing a configuration of a first embodiment in accordance with the present invention.

FIG. 5 is a block diagram showing a first embodiment in accordance with the present invention, an embodiment of a light-controlled light modulator for carrying out wavelength conversion. The wavelength converter comprises semiconductor optical amplifiers (SOAs) 501 and 502; MMI couplers 503 and 504 connected to the SOAs 501 and 502; an MMI coupler 505 connected to the MMI coupler 504; and a loop-type interferometer 513 connected between the MMI couplers 503 and 505.

The SOAs 501 and 502 and the MMI couplers 503 and 504 constitute a filter-equipped phase modulator 515 (shown by broken lines in FIG. 5). The reference numeral 506 designates signal light, 507 designates continuous light, 508 designates counterclockwise traveling light, 509 designates clockwise traveling light, 510 designates output light, 511, 512, 514, 516, 517 and 518 each designate a port.

The present embodiment employs the MMI coupler 503 as a means for combining the first input light and the second input light, and distributes them to plurality of ports. It further uses the SOAs 501 and 502 as a phase modulator with a medium that changes the refractive index in response to the intensity of the first input light; and the MMI coupler 504 for combining the outputs from the phase modulator.

In this configuration, the continuous light $\lambda j(cw)$ 507 with the wavelength $\lambda j$ is launched into the MMI coupler 505 via the port 512, and is split into two parts by the MMI coupler 505 to be led to the loop-type interferometer 513. In the loop-type interferometer 513, they travel around the loop as separate clockwise traveling light 509 and counterclockwise traveling light 508. The two light waves pass through the filter-equipped phase modulator 515, and are coupled again by the MMI coupler 505 to be emitted from the port 512. In this state, the signal light 506 with the wavelength $\lambda i$ is launched into the filter-equipped phase modulator 515 via the port 517.

To achieve the filtering function, the present embodiment employs a symmetric Mach-Zehnder interferometer that comprises the two MMI couplers 503 and 504 which are connected via the two waveguides (arms) including the SOAs 501 and 502 as shown in FIG. 5 as the filter-equipped phase modulator 515.

Generally speaking, in the symmetric Mach-Zehnder interferometer, the incident light is split by the first coupler into two parts, which pass through the two waveguides (arms), and are coupled again by the second coupler, to be emitted from the output port at the crossing position with the input port. The filtering function of the present embodiment utilizes the feature of the Mach-Zehnder interferometer.

The signal light $\lambda i(s)$ 506 with the wavelength $\lambda i$ is launched into the MMI coupler 503 via the port 517. The incident signal light 506 is split into two parts, which pass through the SOAs 501 and 502, and are combined again by the MMI coupler 504 to be output from the port 514 at the crossing position with the input port 517. Thus, the configuration prevents the input signal light 506 from entering the loop-type interferometer 513 because of the filtering function by the Mach-Zehnder interferometer.

The continuous light 508 with the wavelength λj that travels the loop counterclockwise, that is, the light to be converted, is launched into the MMI coupler 504 via the port 518, and is split into two parts, which pass through the SOAs 501 and 502, and are combined by the MMI coupler 503 to be emitted from the port 516 at the crossing position with the input port 518, and to travel the loop again. In this case, since no component is supplied to the port 517, no excessive loss takes place.

Likewise, the continuous light 509 with the wavelength λj that travels the loop clockwise, that is, the light to be converted, is launched into the MMI coupler 503 via the port 516, and is split into two parts, which pass through the SOAs 501 and 502 and are combined by the MMI coupler 504 to be emitted from the port 518 at the crossing position with the input port 516, and to travel the loop again. In this case, since no component is supplied to the port 514, no excessive loss takes place.

Thus, as for the light to be converted consisting of the continuous light waves 508 and 509 with the wavelength λj that travels the loop, no excessive loss occurs in principle by passing through the couplers 503 and 504 for coupling the signal light waves.

Figure 3A:
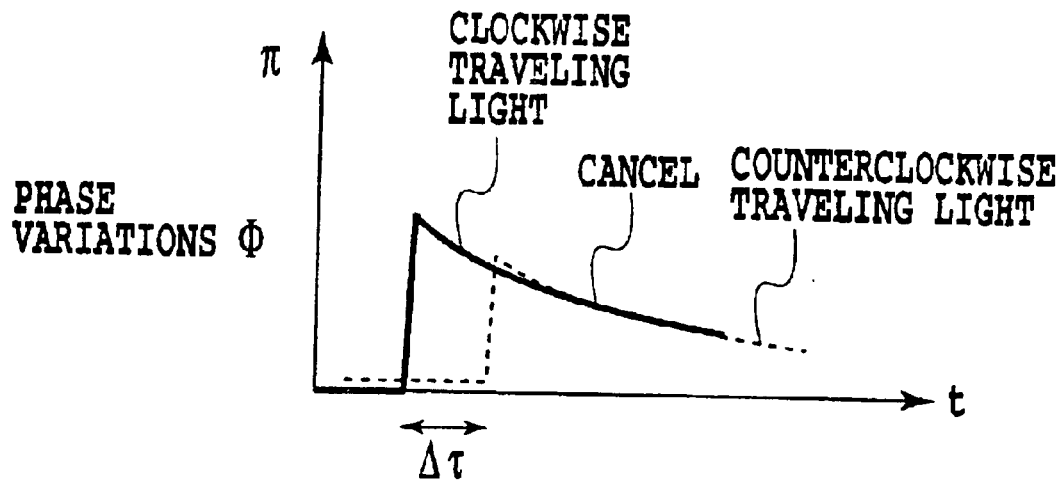
FIGS. 3A and 3B are graphs illustrating the phase variations and light intensity characteristics of the conventional wavelength converter.

When the input signal light 506 passes through the SOAs 501 and 502, their refractive indices vary. The light with the wavelength λj traveling the loop undergoes the effect of the variations in the refractive indices of the SOAs 501 and 502, bringing about the phase variations as illustrated in FIG. 3A.

The clockwise traveling light 509 undergoes the abrupt phase variation, followed by recovering the original phase in the time period corresponding to the recovery time of carrier density changes of the SOA, and is launched into the MMI coupler 505. Although the counterclockwise traveling light 508 is also subjected to similar phase variations, since it travels the loop-type interferometer longer than the clockwise traveling light, it is launched into the MMI coupler 505 with a delay Δτ.

Figure 3B:
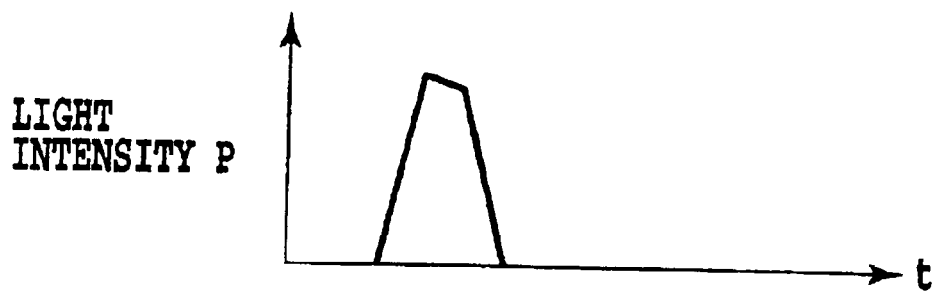

Thus, in the MMI coupler 505, the phase variations of the clockwise and counterclockwise traveling light waves take place with a time shift of Δτ. The two continuous light waves with the same wavelength λj interfere with each other in the MMI coupler 505. In the course of this, their phases differ only during the time period Δτ and nearly equal thereafter. As a result of the interference, the light is supplied to the port 511 only during the time slot Δτ as illustrated in FIG. 3B. In other words, the input optical signal with the wavelength λi is converted to the light with the wavelength λj to be output to the port 511 as output light λj(s) 510.

In the wavelength converter with such a loop-type interferometer, the counterclockwise traveling light 508 and the clockwise traveling light 509 have the same phase variations during the time while the light phase variations gradually recover in response to the recovery of the carrier density in the SOAs 501 and 502, except for the foregoing time period Δτ. Therefore, as a result of the interference, the effect of the variations in the refractive indices in the SOAs 501 and 502 are canceled out, and the light 507 with the wavelength λj is emitted to the port 512. Thus, as illustrated in FIG. 3B, the waveform after the wavelength conversion output from the port 511 includes no low-rate components whose rate is limited by the recovery time due to the carrier density changes, enabling high-speed wavelength conversion with steep rising and falling edges.

In the present embodiment, the input light 506 is output from the port 514, and is not output from the port 511. Thus, it is unnecessary to connect the wavelength filter for separating the input light and the output light to the output port. Therefore, even when the wavelength λi of the signal light equals the wavelength λj of the light to be converted, the wavelength conversion becomes possible without mixing noise into the wavelength-converted light output from the port 511.

Furthermore, the light to be converted 508 traveling counterclockwise, that is, a portion of the continuous light 507 with the wavelength λj, is guided from the port 518 to the port 516, while the light to be converted 509 traveling clockwise, that is, a portion of the continuous light 507 with the wavelength λj, is guided from the port 516 to the port 518, bringing about no excessive loss. Therefore, regardless of whether the signal light and the light to be converted have the same wavelength or not, the present embodiment can implement the low-loss, high-speed wavelength conversion without the filter.

When using the wavelength converter with the loop-type interferometer, the following points must be noticed. Specifically, the present embodiment uses the symmetric Mach-Zehnder interferometer in which the MMI couplers 503 and 504 are connected by the two waveguides (arms) including the SOAs 501 and 502 to achieve the filtering function.

Since the switching operation of the Mach-Zehnder interferometer takes place when the produce Δn×L becomes δ, where Δn is the variation in the refractive index of the structure consisting of the medium constituting the arms of the interferometer and L is the length of the portion in which the refractive index varies, it is common to take L at a rather large value to implement lower-power operation.

Generally speaking, the symmetric Mach-Zehnder interferometer assumes that one or two signal light waves are launched thereinto. When the two signal light waves are launched, they travel either in the same direction or in the opposite directions. Therefore, it is enough to optimize the conditions either for the same direction or for the opposite directions. Accordingly, it is advantageous that the length L is longer of the portion in which the refractive index of the arms varies.

In the wavelength converter in accordance with present invention, there are three incident light waves: the clockwise traveling continuous light 509, the counterclockwise traveling continuous light 508 and the signal light 506. Although the clockwise traveling continuous light 509 travels in the same direction as the signal light 506, the counterclockwise traveling continuous light 508 travels in the directions opposite to the signal light 506. Thus, they travel in the same direction and opposite directions at the same time in the Mach-Zehnder interferometer.

The clockwise traveling continuous light 509 undergoes the effect of the refractive index changes throughout the length $L_{SOA}$ of the SOA 501 or 502 because it travels in the same direction as the signal light 506. In contrast, the counterclockwise traveling continuous light 508 does not until it encounters the signal light 506 because it travels in the direction opposite to the signal light, and hence it requires tr=2 $L_{SOA}/(c/n_{eq})$ as the rising time of the phase change, where c is the speed of light and $n_{eq}$ is the equivalent refractive index of the SOA.

Therefore, when the length $L_{SOA}$ of the SOAs 501 and 502 is in the same order as ΔL, the phase variations of the clockwise and counterclockwise continuous waves become as illustrated in FIG. 6A. Accordingly, the waveform of the converted wave supplied to the port 511 is deformed as illustrated in FIG. 6B, preventing the high-speed operation.

Besides, because of the reduction in the extinction ratio due to the reduction in the intensity of the converted light, the ratio between the intensity of the converted light and that of the crosstalk components decreases, disabling the filter-free operation.

Therefore, to achieve the high-speed, high extinction ratio filter-free wavelength conversion, it is necessary to limit the length of the SOAs used in the present invention. Specifically, the length of the SOAs is determined such that the tr becomes smaller than $\Delta\tau$.

$$L_{SOA} = (c/n_{eq})/2 \times tr < (c/n_{eq})/2 \times \Delta\tau$$
$$= (c/n_{eq})/2 \times \Delta L/(c/n_{eq0})$$
$$= (n_{eq0}/n_{eq}) \times \Delta L/2$$

Setting the length as such, the phase difference between the clockwise and counterclockwise continuous light waves become as illustrated in FIG. 6C, and the waveform of the intensity of the converted light emitted to the port 511 becomes as illustrated in FIG. 6D, thereby implementing the high-speed operation.

[Embodiment 2]

To achieve high-speed operation in the present invention, the SOAs 501 and 502 can have a divided electrode structure. The conventional SOA has two electrodes, one of which constitutes its p-electrode and the other of which constitutes its n-electrode. In contrast, the SOA of the present embodiment is characterized in that it has multiple p-electrodes when using an n-substrate, multiple n-electrodes when using a p-substrate, and at least multiple p-electrodes or n-electrodes when using a semi-insulating substrate.

Figure 7:
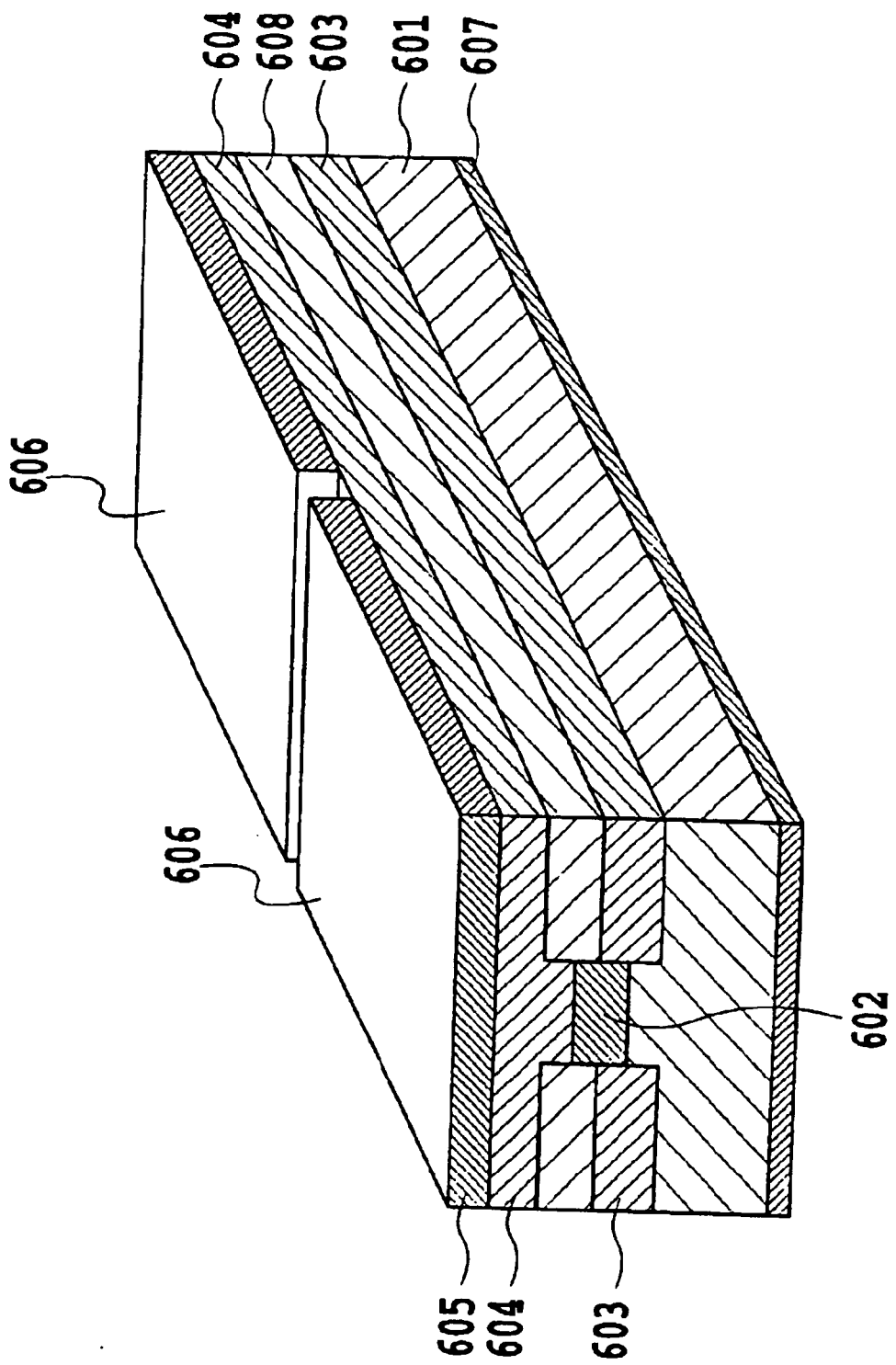
FIG. 7 is a perspective view showing a structure of an SOA of a second embodiment in accordance with the present invention.

FIG. 7 is a perspective view of a second embodiment in accordance with the present invention, which shows a structure of an SOA using an n-substrate. In FIG. 7, the reference numeral 601 designates an n-InP substrate, 602 designates an InGaAsP active layer, 603 and 604 each designate a p-InP layer, 605 designates a p-InGaAsP cap layer, 606 designate p-electrodes, 607 designates an n-electrode and 608 designates an n-InP layer. In the structure, the p-electrodes and p-InGaAsP cap layer are each divided so that current can be injected into the two regions independently. The two-electrode structure of the SOA as shown in FIG. 7 enables the following operation by varying the levels of the injection current into the two regions.

More specifically, in this structure, the light 509 traveling in the loop clockwise and the light 508 traveling counterclockwise are both launched into the two-electrode SOAs 501 and 502 from the opposite directions to each other, and are emitted to the opposite directions. Accordingly, varying the levels of the injection currents to the two regions can change the saturation characteristics of the SOAs for the light 509 traveling in the loop clockwise and for the light 508 traveling counterclockwise.

Figure 4A:
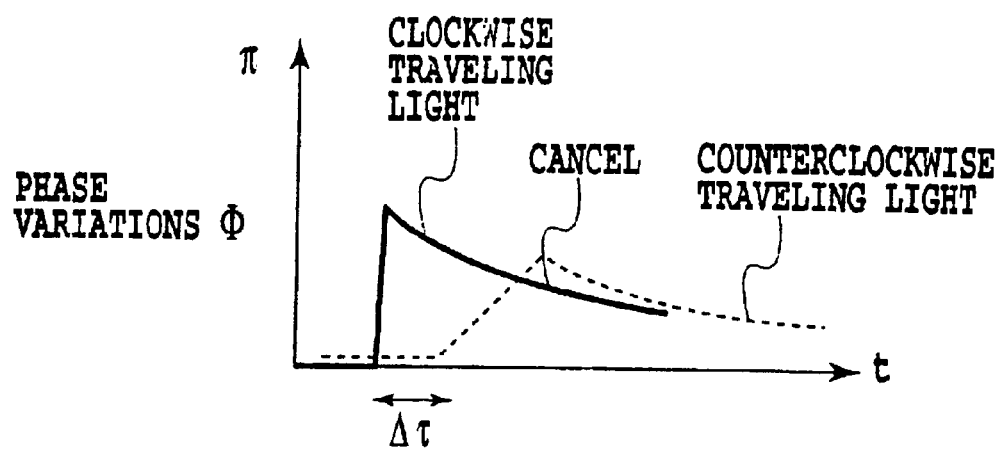
FIGS. 4A and 4B are graphs illustrating another example of the phase variations and light intensity characteristics of the conventional wavelength converter.
Figure 4B:
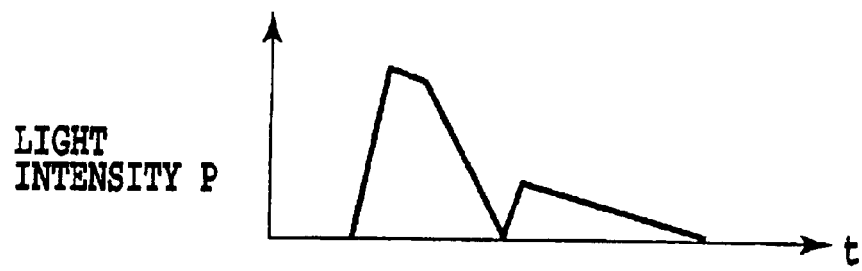

As a result, the phase relationships between the clockwise traveling light 509 and the counterclockwise traveling light 508 vary, so that the waveform of the converted light emitted from the port 511 varies because of the interference effect in the 3 dB coupler 505. Therefore, adjusting the currents flowing through the two electrodes makes it possible to implement the output waveform without the "lobe" as shown in FIG. 4B.

[Embodiment 3]

The gain waveguide region of the conventional SOA has a uniform cross-sectional profile regardless of the position. In contrast, in the wavelength converter of the present embodiment, the gain waveguide region of the SOA 501 or 502 changes its cross-sectional profile according to the position to achieve the high-speed operation.

FIGS. 8A–8C are cross-sectional views showing a third embodiment in accordance with the present invention, which illustrate a structure of an SOA fabricated on an n-type substrate. FIG. 8A is a view illustrating a cross-sectional profile along the waveguide core of the SOA; and FIGS. 8B and 8C are cross-sectional views illustrating profiles along VIIIB—VIIIB line and VIIIC—VIIIC line of FIG. 8A, respectively.

The SOA comprises an InGaAsP active layer 612 constituting a gain medium on a first surface of an n-InP substrate 611. At both sides of the waveguide region, a region consisting of a p-InP layer 613 and an n-InP layer 614, which are stacked in this order, is formed. On the InGaAsP active layer 612 and the n-InP layer 614, a p-InP layer 615, a p-InGaAsP layer 616 constituting a cap layer, and a p-electrode 617 are stacked in this order. On a second surface of the n-InP substrate 611, an n-electrode 618 is formed.

FIGS. 9A–9D are graphs each illustrating a waveguide width of the SOA, which has a device length of (L1+L2) and is included in the wavelength converter of the present embodiment, as a function of the position in the direction of the device length.

Figure 9A:
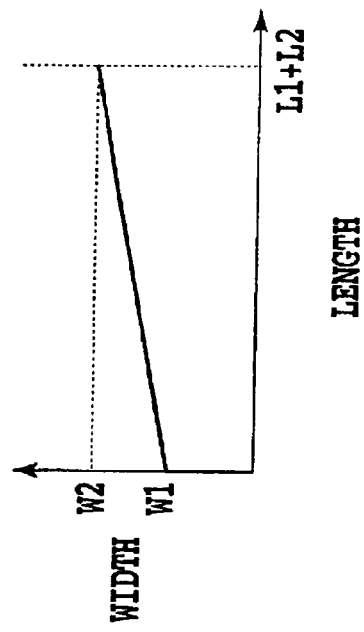
FIGS. 9A–9D are graphs illustrating, as a function of the device length, the width of the waveguide of the SOA with the device length (L1+L2), which is included in the wavelength converter in accordance with the present invention.
Figure 9C:
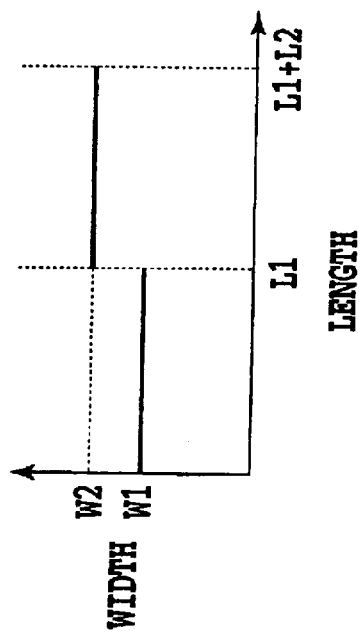
Figure 9B:
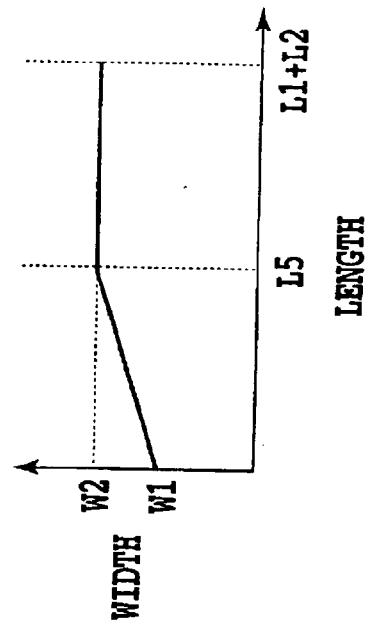
Figure 9D:
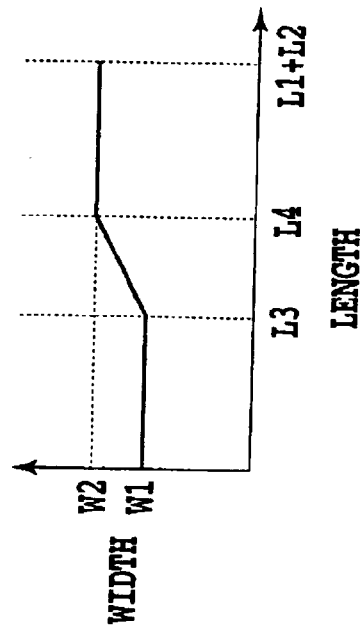

The waveguide width of the SOA as illustrated in FIG. 9A is W1 from the position 0 to L1, and changes stepwise to W2 at the position L1. The waveguide width of the SOA as illustrated in FIG. 9B changes linearly from W1 to W2 from the position 0 to (L1+L2). The waveguide width of the SOA as illustrated in FIG. 9C is W1 from the position 0 to L3, changes linearly from W1 to W2 from the position L3 to L4, and is fixed at W2 from L4 to (L1+L2). The waveguide width of the SOA as illustrated in FIG. 9D changes linearly from W1 to W2 from the position 0 to L5, and is fixed at W2 from L5 to (L1+L2).

The saturation power of the SOA is proportional to the ratio s/Γ, where S is cross-sectional area of the active layer constituting the gain medium of the SOA, and Γ is the confinement factor of the optoelectric field. Since the cross-sectional area S and the confinement factor Γ vary by the waveguide width, the SOAs with the structure as shown in FIG. 8A–8C and FIGS. 9A–9D vary their saturation power by the position.

Figure 1:
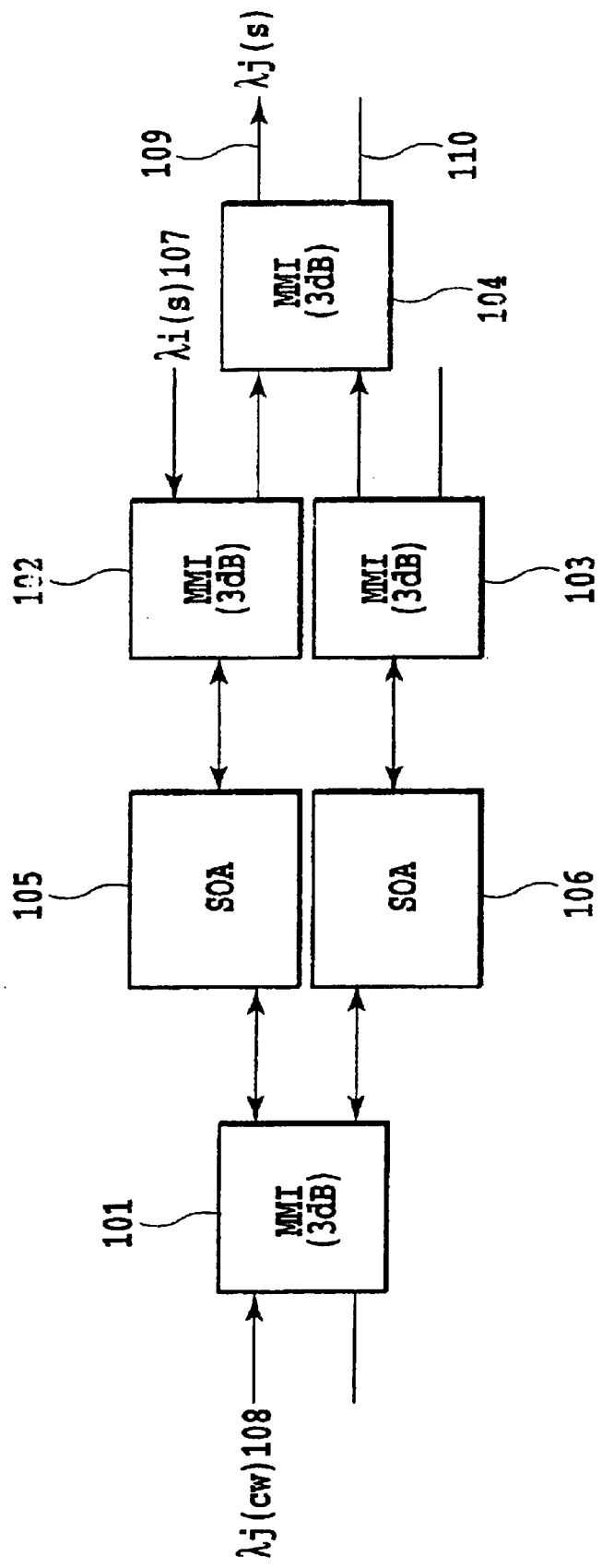
FIG. 1 is a block diagram showing an example of a conventional wavelength converter.
Figure 2:
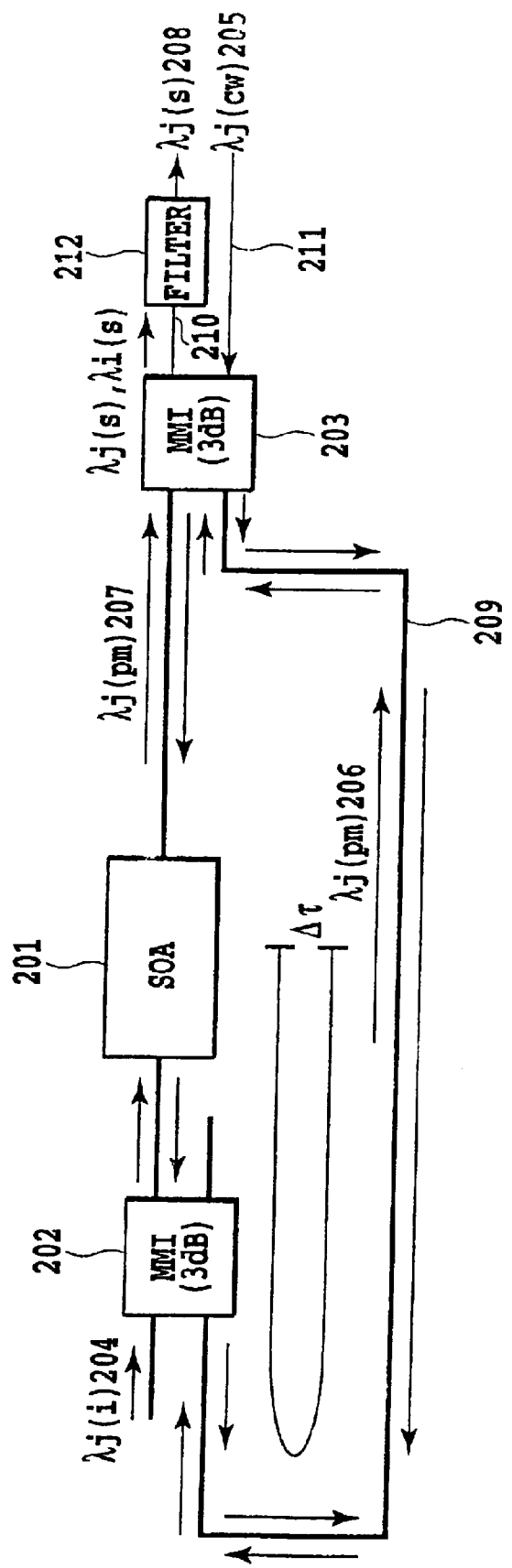
FIG. 2 is a block diagram showing another example of a conventional wavelength converter.

Although the basic operational principle of the SOAs with these structures is the same as that of the conventional wavelength converter as illustrated in FIG. 2, they differ in the following points because of the varying cross-sectional profile of the gain region.

In the loop-type interferometer 513 as shown in FIG. 5, the clockwise traveling light 509 and the counterclockwise traveling light 508 are launched into the SOAs 501 and 502 from the opposite directions. Assume that the SOAs 501 and 502 have a gain region with the cross-sectional profile varying with position as shown in FIG. 9A. Then, the SOAs 501 and 502 can each be considered equivalent to a cascade connection of two SOAs with different saturation characteristics, that is, an SOA with the waveguide width W1 and device length L1 and an SOA with the waveguide width W2 and device length L2.

Accordingly, each of the light waves traveling in the SOAs 501 and 502 successively passes through two SOAs with different saturation characteristics depending on its traveling direction. Hence, the clockwise traveling light 509 and the counterclockwise traveling light 508 are differently affected by the saturation characteristics of the SOAs in the loop-type interferometer 513. As a result, the phase relationships between the clockwise traveling light 509 and the counterclockwise traveling light 508 also vary so that the waveform of the converted light 510 emitted from the port 511 also varies because of interference in the 3 dB coupler 505. Thus, making use of the characteristics enables the "lobe" as shown in FIG. 4B to be removed from the converted light, thereby achieving the output waveform as shown in FIG. 3B.

Although the SOAs 501 and 502 are assumed to have the waveguide width as illustrated in FIG. 9A here, the variations in the waveguide width are not limited to it. Any variation involving at least two waveguide widths is applicable, and any number of waveguide widths will achieve a similar effect.

Furthermore, it is enough for the waveguide width to vary in the direction of the device length regardless whether the variation is continuous or discontinuous, and regardless of the rate of change, offering the foregoing effect. Accordingly, the waveguide width can vary throughout the region of the SOAs 501 and 502 as shown in FIG. 9B. Alternatively, it can vary continuously at least in a part of the region as illustrated in FIG. 9C or 9D.

Although the present embodiment is described by way of example wherein the waveguide core of the SOA includes only an active layer, this is not essential. The same argument holds true as long as the waveguide width varies, regardless of whether the waveguide region comprises an optical guide layer or optoelectric separate-confinement heterostructure layer(SCH layer), implementing high-speed operation.

Although the present embodiment is explained taking an example where the waveguide width of the SOA varies, it should be added that the same argument holds true when the thickness d of the waveguide core or gain medium varies, offering a similar effect. In this case, the waveguide width W in connection with FIGS. 9A–9D is replaced by the thickness d, and the same argument holds as long as the thickness d varies regardless of whether its variation is continuous or discontinuous. Besides, it is obvious that the variations in both the width and thickness of the waveguide will achieve a similar effect.

In summary, as long as the cross-sectional profile of the waveguide core of the SOA varies, the saturation power is variable depending on the position regardless of whether one or both of the width and thickness vary, or the variation is continuous or discontinuous. As a result, the high-speed operation can be implemented.

[Embodiment 4]

FIGS. 10A–10C are cross-sectional views illustrating a structure of a fourth embodiment in accordance with the present invention, a structure of an SOA applicable to the wavelength converter in accordance with the present invention as shown FIG. 5.

FIG. 10A is a view illustrating a cross-sectional profile along the waveguide core of the SOA; and FIGS. 10B and 10C are views illustrating cross-sectional profiles along XB—XB line and XC—XC line of FIG. 10A, respectively.

The SOA comprises an InGaAsP active layer 622 constituting a gain medium on a first surface of an n-InP substrate 621 in such a manner that it is sandwiched by two guide layers (sometimes called a separate-confinement heterostructure layer or SCH layer), InGaAsP layers 629 and 630. At both sides of the waveguide region, a region consisting of a p-InP layer 623 and an n-InP layer 624, which are stacked in this order, is formed. On the InGaAsP layer 630 and the n-InP layer 624, a p-InP layer 625, a p-InGaAsP layer 626 constituting the cap layer, and a p-electrodes 627 are stacked in this order. On a second surface of the n-InP substrate 621, an n-electrode 628 is formed.

In the structure as shown in FIGS. 10A–10C, the thickness of the upper guide layer 630 stacked on the InGaAsP active layer 622 varies with the position. Although its thickness is $d_1$ at an end of the SOA as shown in FIG. 10B, it is zero at the other end as shown in FIG. 10C. In the SOA with such a structure, the optoelectric confinement factor Γ in the gain medium consisting of the active layer varies with the position. Therefore, the saturation power of the SOA also varies, enabling the high-speed operation like that of the SOA described in the embodiment 3.

Here, it does not matter whether the thickness of the upper InGaAsP guide layer 630 varies continuously throughout the SOA, or discontinuously at some part. Besides, it is enough for the thickness of the upper InGaAsP guide layer 630 to vary, regardless of whether it varies to zero or not.

Furthermore, the layer that varies its thickness is not limited to the upper InGaAsP guide layer 630. Any layer that can vary the optical confinement factor Γ of the active layer with position is applicable. More specifically, it is enough that the thickness varies in at least one of the InGaAsP active layer 622, upper InGaAsP guide layer 630 and lower InGaAsP guide layer 629.

[Embodiment 5]

Figure 11:
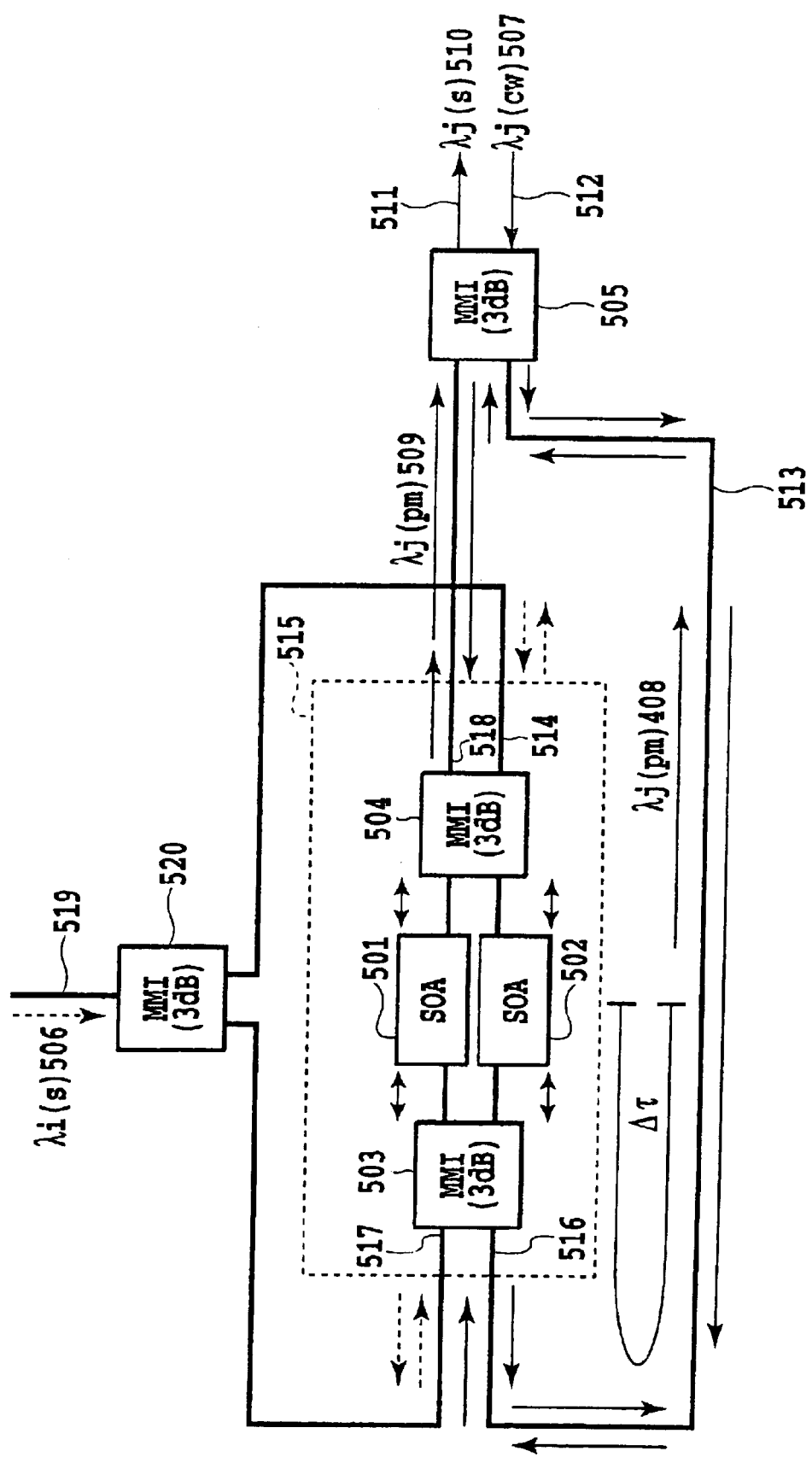
FIG. 11 is a block diagram showing a structure of an fifth embodiment in accordance with the present invention.

FIG. 11 is a block diagram showing a configuration of an fifth embodiment in accordance with the present invention, in which an MMI coupler 520 is connected to the MMI couplers 503 and 504 of the wavelength converter in accordance with the present invention as shown in FIG. 5.

Signal light 506 with the wavelength λi is launched into an MMI coupler 520 via a port 519. A first part of the signal light λi(s) 506 split by the MMI coupler 520 is launched into the MMI coupler 503 via the port 517. It is further split into two parts, which pass through the SOAs 501 and 502, and are combined by the MMI coupler 504. The output of the MMI coupler 504 is emitted from the port 514 at the crossing position with the port 517.

On the other hand, a second part of the signal light 506 split by the MMI coupler 520 is launched into the MMI coupler 504 via the port 514. It is further split into two parts, which pass through the SOAs 501 and 502, and are combined by the MMI coupler 503. The output of the MMI coupler 503 is emitted from the port 517 at the crossing position with the port 514. Thus, the input signal light 506 does not enter the loop-type interferometer because of the filtering function of the Mach-Zehnder interferometer.

When the input signal light 506 passes through the SOAs 501 and 502, the refractive indices in the SOAs 501 and 502 vary. The light with the wavelength λj traveling in the loop is affected by the variations in the refractive indices in the SOAs, thereby bringing about the phase variations similar to that of FIG. 3A. The clockwise traveling light 509 undergoes abrupt phase variations, followed by recovering its original phase in the time period corresponding to the recovery time of carrier density changes in the SOA, and is launched into the MMI coupler 505. The counterclockwise traveling light 508 undergoes similar phase variations. However, since it travels in the loop-type interferometer longer than the clockwise traveling light, it is launched into the MMI coupler 505 with a time delay of Δτ. Accordingly, in the MMI coupler 505, the time of the phase variations shifts by an amount of Δτ between the clockwise and counterclockwise traveling light waves. Thus, only during the time Δτ, the light with the wavelength λj is emitted from the port 511 because of the interference effect as in FIG. 3B.

In other words, the input optical signal with the wavelength λi is converted to the light with the wavelength λj to be emitted from the port 511. In the wavelength converter with the loop-type interferometer, the region in which the phase variations are limited by the recovery time of carrier density changes are canceled out. Thus, the wavelength converter is free from the limitation, thereby enabling the high-speed wavelength conversion.

In the present embodiment, the input light 506 is emitted from the ports 514 and 517, but never from the port 511. Thus, it is not necessary to provide the output port with a wavelength filter for separating the input light and the output light. Accordingly, even when the wavelength $\lambda i$ of the signal light is identical to the wavelength $\lambda j$ of the converted output light, the converted light emitted from the output port 511 is free from noise, enabling high-quality wavelength conversion.

To achieve the high-speed operation in the present invention, the signal light is split by the MMI coupler 520 to be launched into the SOAs 501 and 502 from both sides via the optical signal waveguides 514 and 517 as shown in FIG. 11. Thus, both the clockwise traveling light 509 and counterclockwise traveling light 508 pass through the SOAs 501 and 502 not only in the same direction as the split signal light, but also in the opposite direction to it.

Figure 12A:
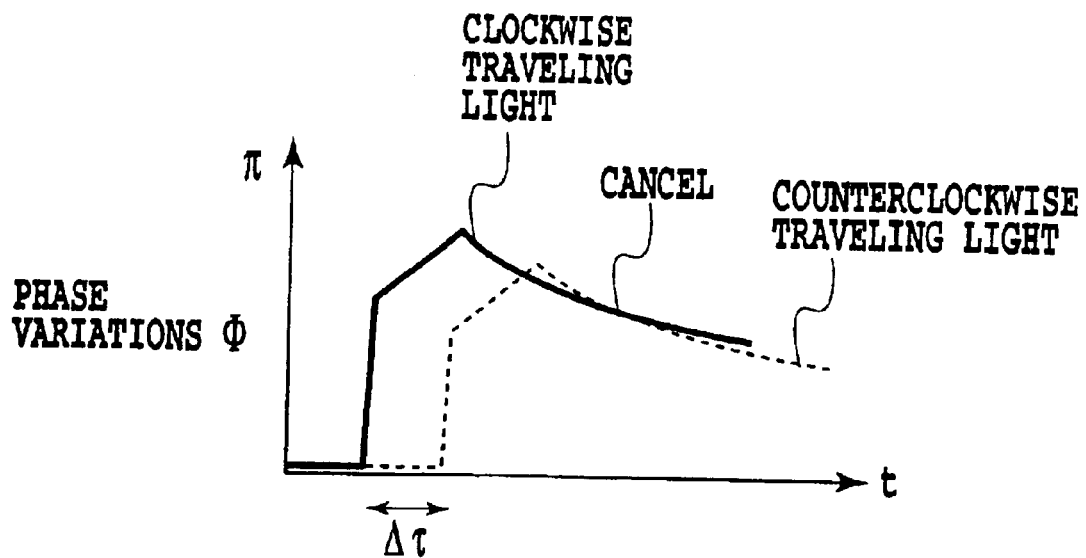
FIGS. 12A and 12B are graphs illustrating the phase variations and light intensity characteristics of a wavelength converter in accordance with the present invention.
Figure 12B:
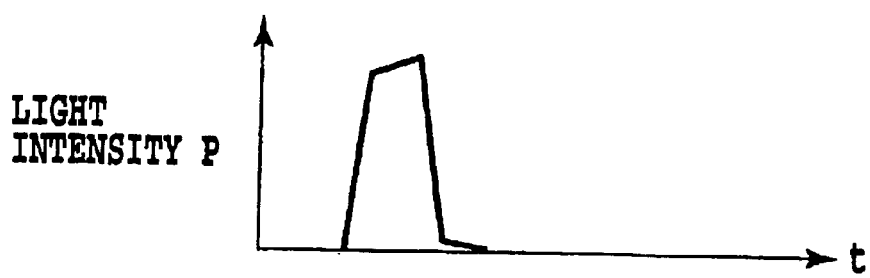

Thus, the phase variations of the clockwise traveling light 509 and counterclockwise traveling light 508 have the abrupt and completely identical waveform as illustrated in FIG. 12A. As a result, the waveform of the conversion output has steep rising and falling edges as illustrated in FIG. 12B, achieving a high bit rate output waveform.

[Embodiment 6]

Figure 13:
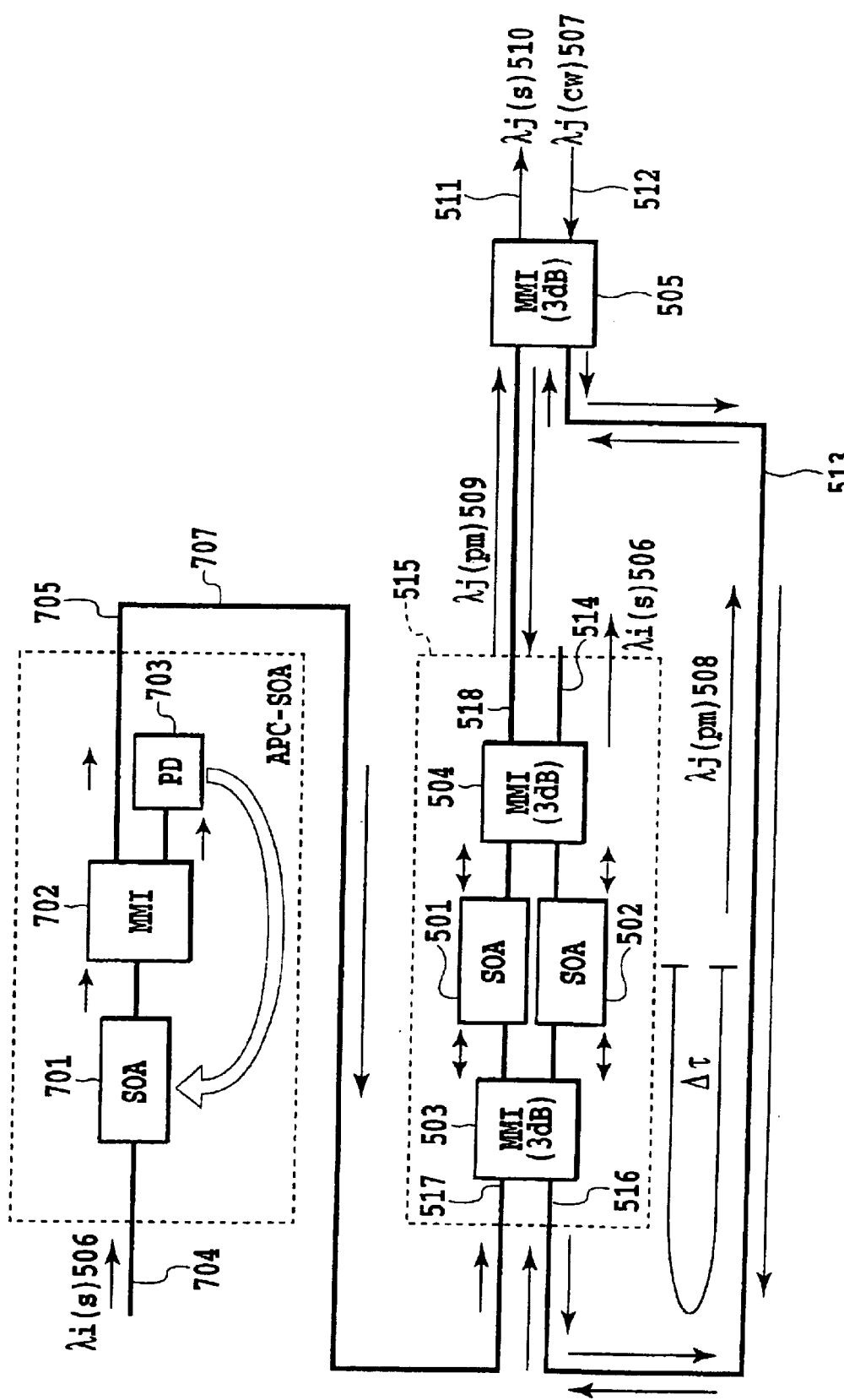
FIG. 13 is a block diagram showing a configuration of a sixth embodiment in accordance with the present invention.

FIG. 13 is a block diagram showing a sixth embodiment in accordance with the present invention, which is still another embodiment of a light-controlled light modulator for carrying out the wavelength conversion. Generally speaking, the wavelength converter has a so-called optimum signal light intensity range. The present embodiment includes a functional circuit for controlling the input light intensity with an SOA installed at a stage before the wavelength converter of the embodiments 1, 2, 3, 4 and 5.

In this configuration, signal light 506 that is launched into a port 704 is amplified by an SOA 701, and is input to an MMI coupler 702. A fraction of the light passing through the MMI coupler 702 is launched into a photodiode (PD) 703 so that its light intensity is measured. As indicated in FIG. 7 by an arrow, electric feedback based on the measurement of the light intensity is made to decide the injection current into the SOA 701, thereby controlling the gain.

Thus, the signal light with its optical intensity being controlled by the SOA 701 is output from the port 705. The optical signal passes through a waveguide 707, and is launched into a port 517 of a post-stage filter-equipped phase modulator 515 with the optimum optical intensity for the wavelength conversion. Thus, even if the input light intensity to the wavelength converter varies, the optical signal with the optimum light intensity is always launched into the wavelength converter. As a result, the present embodiment can increase the margin of the input light intensity as compared with the foregoing embodiment 1.

[Embodiment 7]

Figure 14:
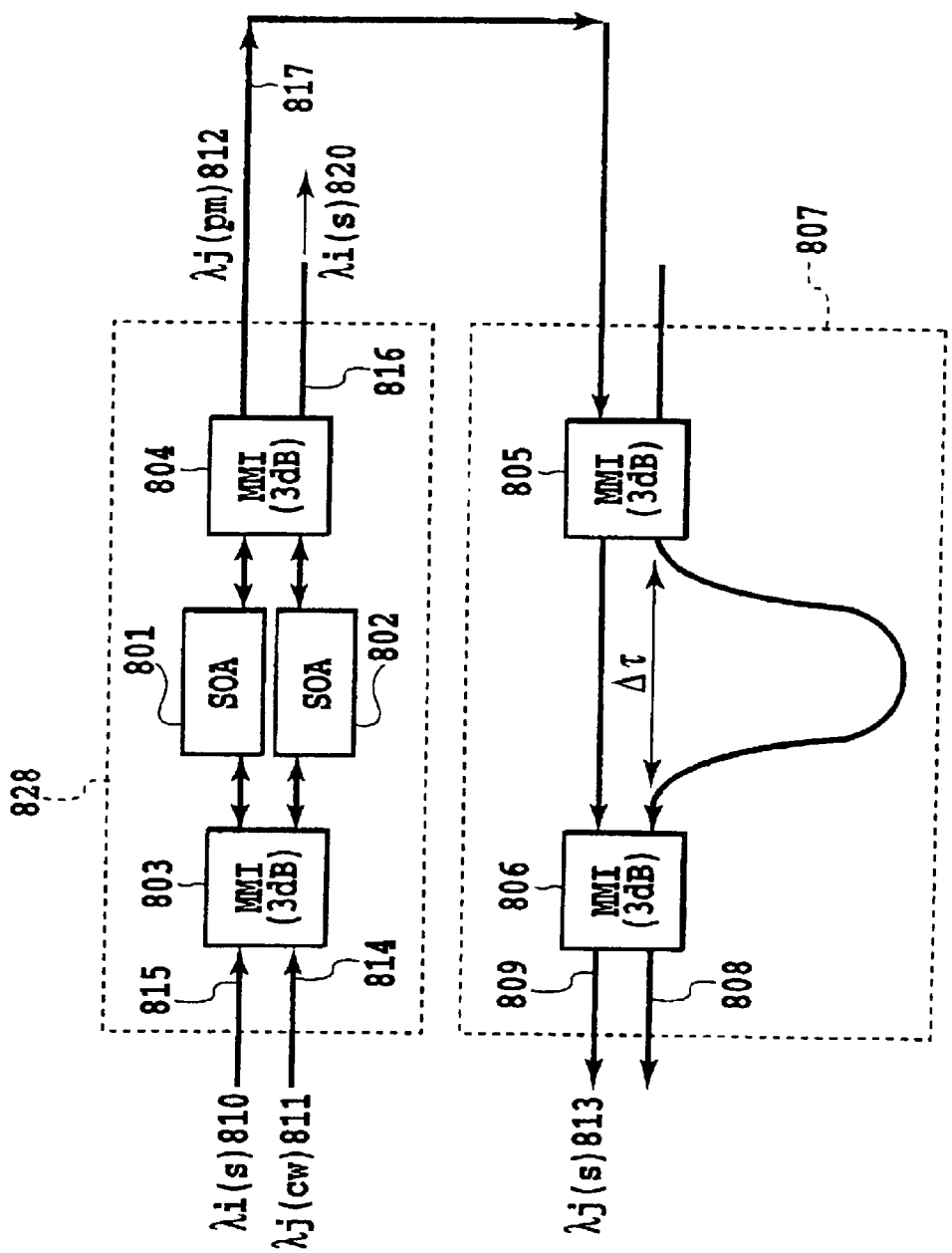
FIG. 14 is a block diagram showing a configuration of a seventh embodiment in accordance with the present invention.

FIG. 14 is a block diagram showing a configuration of a seventh embodiment in accordance with the present invention, another embodiment of the light-controlled light modulator for carrying out the wavelength conversion. The present embodiment is a wavelength converter employing an asymmetric Mach-Zehnder interferometer 807 instead of the loop-type interferometer 513 of the foregoing embodiment 1.

The wavelength converter comprises a filter-equipped phase modulator 828 and an asymmetric Mach-Zehnder interferometer 807. The filter-equipped phase modulator 828 is a symmetric Mach-Zehnder interferometer comprising SOAs 801 and 802, and MMI couplers 803 and 804. The asymmetric Mach-Zehnder interferometer 807 comprises MMI couplers 805 and 806, and two waveguides with different length.

In this configuration, the continuous light $\lambda j(cw)$ 811 with the wavelength $\lambda j$ is launched into the MMI coupler 803 via the port 814, and is split into two parts by the MMI coupler 803. The two parts pass through the SOAs 801 and 802, and are combined by the MMI coupler 804 to be emitted from the port 817. The emitted light passes through the asymmetric Mach-Zehnder interferometer 807, and is output from the port 808.

In this state, the signal light $\lambda i(s)$ 810 with the wavelength $\lambda i$ is launched into the MMI coupler 803 via the port 815. The incident signal light 810 is split into two parts, which pass through the SOAs 801 and 802, and are combined by the MMI coupler 804 to be emitted from the port 816. Because of the filtering function of the filter-equipped phase modulator 828, the input signal light is not launched into the post-stage asymmetric Mach-Zehnder interferometer 807.

When the input signal light 810 passes through the SOAs 801 and 802, the refractive indices in the SOAs 801 and 802 vary. The light with the wavelength $\lambda j$ traveling through the filter-equipped phase modulator 828 is phase-modulated by the effect of the variations in the refractive indices, and is launched into the asymmetric Mach-Zehnder interferometer 807 via the port 817.

The phase-modulated light with the wavelength $\lambda j$ is split into two parts by the MMI coupler 805, and the two parts pass through the two waveguides whose lengths differ by $\Delta L$. The light passing through the longer waveguide is delayed by an amount of $\Delta \tau$ compared with the light passing through the shorter waveguide, and the two light waves are launched into the MMI coupler 806 to be combined.

The two continuous light waves with the same wavelength $\lambda j$ interfere with each other in the MMI coupler 806. In the course of this, their phases differ only during the time period $\Delta \tau$ and nearly equal thereafter as in FIG. 3A. As a result of the interference, the light is supplied to the port 809 only during the time slot $\Delta \tau$ in which the phases differ from each other as in FIG. 3B. In other words, the input optical signal with the wavelength $\lambda i$ is converted to the light with the wavelength $\lambda j$ to be output to the port 809 as output light $\lambda j(s)$ 813.

In the wavelength converter with the asymmetric Mach-Zehnder interferometer 807, the light passing through the shorter waveguide and the light passing through the longer waveguide have the same phase variations during the time period except for the foregoing time period $\Delta \tau$. Therefore, as a result of the interference, the effect of the variations in the refractive indices in the SOAs 801 and 802 are canceled out. Thus, the waveform after the wavelength conversion is free from the recovery time of the carrier density changes of the SOAs, thereby enabling high-speed wavelength conversion.

In the present embodiment, the input light 810 is emitted from the port 816, and is not launched into the asymmetric Mach-Zehnder interferometer 807. Thus, it is unnecessary to connect the wavelength filter for separating the input light and the output light to the output port. Therefore, even when the wavelength $\lambda i$ of the signal light equals the wavelength $\lambda j$ of the light to be converted, the wavelength conversion is possible with preventing the signal light, which has undergone the effect of the variations in the refractive indices in the SOA, from being mixed as the noise into the light to be wavelength converted.

Furthermore, the continuous light 811 with the wavelength λj, the light to be converted, is launched into the MMI coupler 803 via the port 814 to be split into two parts. The two parts pass through the SOAs 801 and 802, and are combined by the MMI coupler 804. Its output is guided to the port 817 at the crossing position with the input port 811. Thus, no component emerges from the port 816, bringing about no excessive loss. Therefore, low-loss, high-speed wavelength conversion can be implemented without using any filter regardless of whether the signal light has the same wavelength as the light to be converted or not.

[Embodiment 8]

Figure 15:
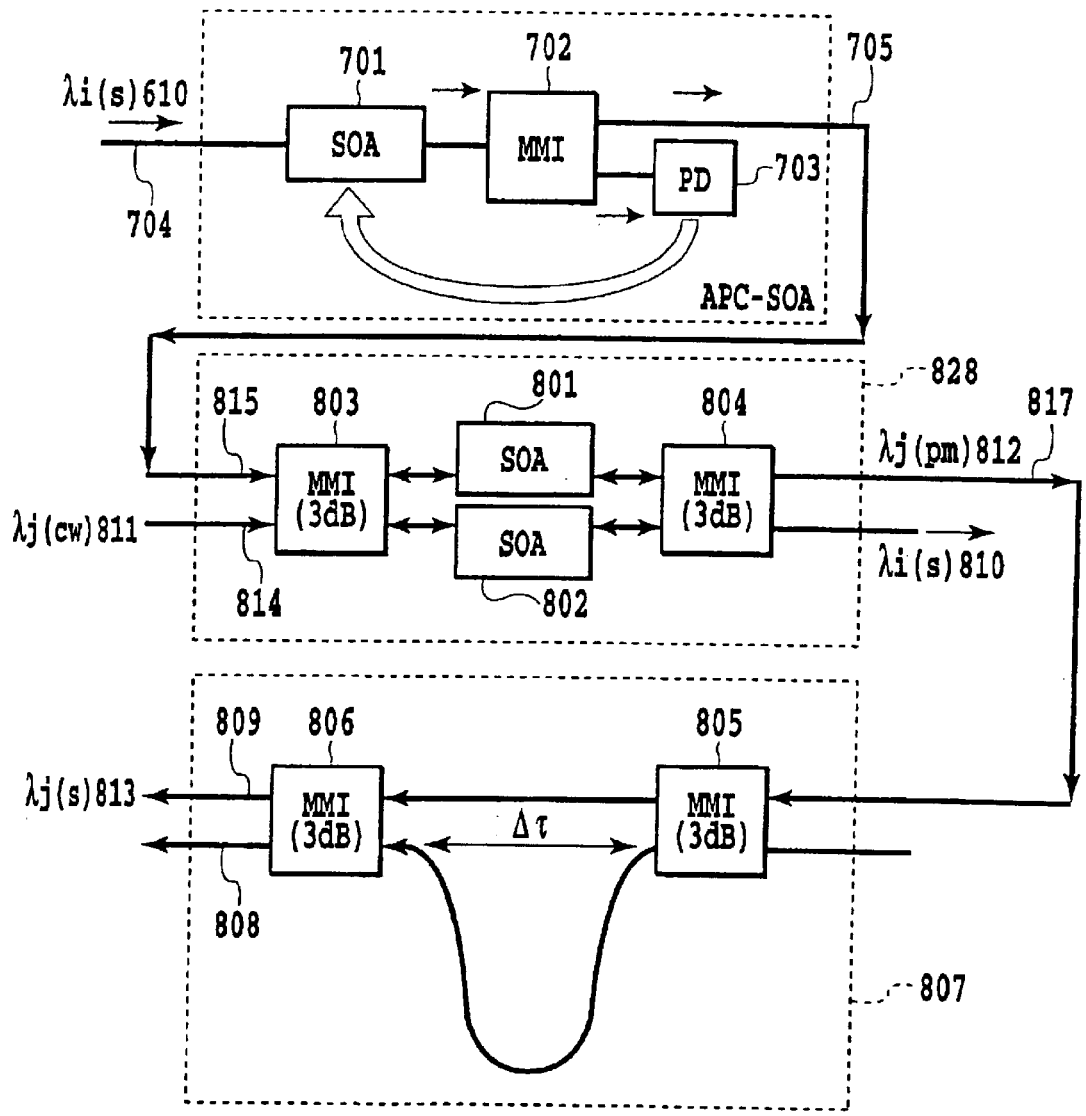
FIG. 15 is a block diagram showing a configuration of a eighth embodiment in accordance with the present invention.

FIG. 15 is a block diagram showing a eighth embodiment in accordance with the present invention, which shows still another embodiment of the light-controlled light modulator for carrying out the wavelength conversion. The present embodiment is a wavelength converter that includes an additional functional circuit for controlling the input light intensity using an SOA provided before the embodiment 7. The principle of the operation of the additional function is the same as that of the foregoing embodiment 6. Although the embodiments 6 and 8 employ the SOA, this is not essential. For example, an optical fiber amplifier can achieve similar advantages.

In addition, although the embodiments 1–8 employ the MMI coupler as the means for combining the first input light and the second input light and for distributing the combined light to a plurality of ports, this is not essential. For example, using a directional coupler or Y-branch will achieve similar advantages. Furthermore, although they employ the SOAs as a medium whose refractive index varies in response to the first input light intensity, any medium or structure that has a refractive index variable in response to the optical intensity is applicable.

It should be noticed that no limitations are imposed on the structure of the SOA of the present embodiment. For example, as the material of the active layer, any one of the InGaAsP, GaAs, AlGaAs, InGaAs and GaInNAs is applicable. As for the active layer structure, any one of the bulk, MQW, quantum wire and quantum dot are applicable, and as for the waveguide structure, any one of the pn-buried structure, ridge structure, semi-insulated buried structure and high-mesa structure are applicable with achieving similar effect.

Although the foregoing embodiments employ the MMI couplers as their couplers, directional couplers are also usable. In addition, although the SOAs are utilized as a phase modulator with a structure consisting of a medium whose refractive index varies in response to the optical intensity of the first input light, other modulators such as phase modulators and intensity modulators can also be used as long as they have such structures as varying their refractive indices in response to the optical intensity.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A light-controlled light modulator comprising:
    first optical branching means for branching first input light;
    optical branching-delaying means for branching and delaying second input light;
    a first optical combiner/splitter for combining a first branched part of the first input light with a first branched part of the second input light, and for distributing them to a plurality of ports;
    phase modulators, which are connected to the plurality of ports, including media that vary their refractive indices in response to the light intensity of the first input light;
    a second optical combiner/splitter for combining outputs from said phase modulators and for branching them to a plurality of parts, and for coupling them with a second branched part of the first input light and a second branched part of the second input light; and
    said optical branching-delaying means being connected to said second optical combiner and including a third optical combiner connected to a plurality of optical branching-delaying circuits which are different in length, wherein when the wavelength of the signal light equals the wavelength of the light to be converted, the wavelength conversion becomes possible without mixing noise into the wavelength-converted light output.

2. The light-controlled light modulator as claimed in claim 1, wherein said first optical combiner/splitter for combining the first input light and the second input light, and for distributing them to the plurality of ports, said phase modulators, which are connected to the plurality of ports, including media that vary their refractive indices in response to the light intensity of the first input light, and said second optical combiner/splitter for combining outputs from said phase modulators constitute a symmetric Mach-Zehnder optical circuit.

3. The light-controlled light modulator as claimed in claim 2, wherein said optical branching-delaying means comprises a loop-type optical interferometer.

4. The light-controlled light modulator as claimed in claim 3, wherein a length of said media whose refractive indices vary in response to the light intensity of the first input light is shorter than a difference between a first length and a second length, the first length being equal to a length from said branching-delaying means for branching and delaying the second input light to said phase modulators via said optical combiner/splitter that combines the first input light with a first branched part of the second input light and distributes them to the plurality of ports, and the second length being equal to a length from said branching-delaying means to said phase modulators via said optical combiner that combines the outputs from said phase modulators and couples them to a second part of the branched second input light.

5. The light-controlled light modulator as claimed in claim 4, wherein semiconductor optical amplifiers are used as said phase modulators including the media whose refractive indices vary in response to the light intensity of the first input light.

6. The light-controlled light modulator as claimed in claim 3, further comprising a plurality of controllers for controlling states of said phase modulators including the media whose refractive indices vary in response to the light intensity of the first input light.

7. The light-controlled light modulator as claimed in claim 6, wherein semiconductor optical amplifiers are used as said phase modulators including the media whose refractive indices vary in response to the light intensity of the first input light.

8. The light-controlled light modulator as claimed in claim 3, wherein the media of said phase modulators with the media whose refractive indices vary in response to the light intensity of the first input light have a cross section that varies along a propagation direction of light.

9. The light-controlled light modulator as claimed in claim 8, wherein semiconductor optical amplifiers are used as said phase modulators including the media whose refractive indices vary in response to the light intensity of the first input light.

10. The light-controlled light modulator as claimed in claim 3, wherein semiconductor optical amplifiers are used as said phase modulators including the media whose refractive indices vary in response to the light intensity of the first input light.

11. The light-controlled light modulator as claimed in claim 2, wherein semiconductor optical amplifiers are used as said phase modulators including the media whose refractive indices vary in response to the light intensity of the first input light.

12. The light-controlled light modulator as claimed in claim 2, further comprising means for controlling the intensity of the first input light.

13. The light-controlled light modulator as claimed in claim 12, wherein said means for controlling the intensity of the first input light comprises an optical amplifier with a gain control function.

14. The light-controlled light modulator as claimed in claim 1, wherein said optical branching-delaying means comprises a loop-type optical interferometer.

15. The light-controlled light modulator as claimed in claim 14, wherein a length of said media whose refractive indices vary in response to the light intensity of the first input light is shorter than a difference between a first length and a second length, the first length being equal to a length from said branching-delaying means for branching and delaying the second input light to said phase modulators via said first optical combiner/splitter that combines the first input light with a first branched part of the second input light and distributes them to the plurality of ports, and the second length being equal to a length from said optical branching-delaying means to said phase modulators via said second optical combiner that combines the outputs from said phase modulators and couples them to a second part of the branched second input light.

16. The light-controlled light modulator as claimed in claim 15, wherein semiconductor optical amplifiers are used as said phase modulators including the media whose refractive indices vary in response to the light intensity of the first input light.

17. The light-controlled light modulator as claimed in claim 14, further comprising a plurality of controllers for controlling states of said phase modulators including the media whose refractive indices vary in response to the light intensity of the first input light.

18. The light-controlled light modulator as claimed in claim 17, wherein semiconductor optical amplifiers are used as said phase modulators including the media whose refractive indices vary in response to the light intensity of the first input light.

19. The light-controlled light modulator as claimed in claim 14, wherein the media of said phase modulators with the media whose refractive indices vary in response to the light intensity of the first input light have a cross section that varies along a propagation direction of light.

20. The light-controlled light modulator as claimed in claim 19, wherein semiconductor optical amplifiers are used as said phase modulators including the media whose refractive indices vary in response to the light intensity of the first input light.

21. The light-controlled light modulator as claimed in claim 14, wherein semiconductor optical amplifiers are used as said phase modulators including the media whose refractive indices vary in response to the light intensity of the first input light.

22. The light-controlled light modulator as claimed in claim 14, further comprising means for controlling the intensity of the first input light.

23. The light-controlled light modulator as claimed in claim 22, wherein said means for controlling the intensity of the first input light comprises an optical amplifier with a gain control function.

24. The light-controlled light modulator as claimed in claim 1, wherein semiconductor optical amplifiers are used as said phase modulators including the media whose refractive indices vary in response to the light intensity of the first input light.

25. The light-controlled light modulator as claimed in claim 24, further comprising means for controlling the intensity of the first input light.

26. The light-controlled light modulator as claimed in claim 25, wherein said means for controlling the intensity of the first input light comprises an optical amplifier with a gain control function.

27. The light-controlled light modulator as claimed in claim 1, further comprising means for controlling the intensity of the first input light.

28. The light-controlled light modulator as claimed in claim 27, wherein said means for controlling the intensity of the input light comprises an optical amplifier with a gain control function.

* * * * *